(12) United States Patent
Huang et al.

(10) Patent No.: US 12,009,117 B2
(45) Date of Patent: Jun. 11, 2024

(54) HYBRID FIBER OPTIC AND ELECTRICAL CONNECTOR

(71) Applicant: Panduit Corp., Tinley Park, IL (US)

(72) Inventors: Yu Huang, Orland Park, IL (US); Jose M. Castro, Naperville, IL (US); Bulent Kose, Burr Ridge, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 17/817,037

(22) Filed: Aug. 3, 2022

(65) Prior Publication Data

US 2023/0368945 A1  Nov. 16, 2023

Related U.S. Application Data

(60) Provisional application No. 63/342,488, filed on May 16, 2022.

(51) Int. Cl.
*H01B 11/22* (2006.01)
*G02B 6/38* (2006.01)
*H01R 13/66* (2006.01)

(52) U.S. Cl.
CPC ............. *H01B 11/22* (2013.01); *G02B 6/381* (2013.01); *H01R 13/6691* (2013.01)

(58) Field of Classification Search
None
See application file for complete search history.

(56) References Cited

U.S. PATENT DOCUMENTS

| | | | |
|---|---|---|---|
| 5,005,939 A | 4/1991 | Arvanitakis et al. | |
| 5,242,315 A | 9/1993 | O'Dea | |
| 6,588,938 B1 | 7/2003 | Ampert et al. | |
| 7,213,975 B2 | 5/2007 | Khemakhem et al. | |
| 7,393,144 B2 | 7/2008 | Khemakhem et al. | |
| 7,798,725 B2 | 9/2010 | Khemakhem et al. | |

(Continued)

FOREIGN PATENT DOCUMENTS

| | | |
|---|---|---|
| JP | 2010217854 A | 9/2010 |
| WO | 2006123214 A1 | 11/2006 |

(Continued)

OTHER PUBLICATIONS

Translation of WO 2010/090211 A1 (Year: 2010).*

*Primary Examiner* — Chad H Smith
(74) *Attorney, Agent, or Firm* — Christopher S. Clancy; James H. Williams; Christopher K. Marlow

(57) ABSTRACT

A system for the transmission of optical and electrical signals has two optical connectors wherein each of the connectors have a metal ferrule electrically connected to a conductor. The system also has an adapter wherein having the connectors optically connected to each other via the adapter also electrically connects the conductor of optical connectors via the metal ferrules of the first and second optical connectors. Alternatively, a system can have first and second optical connectors wherein each of the connectors have an outer housing with a conductive interior surface. This system also has an adapter with at least one metal split sleeve wherein having the connectors optically connected to each other via the adapter also electrically connects optical connectors via the conductive interior surface of the outer housing of each optical connector contacting the at least one metal split sleeve.

4 Claims, 5 Drawing Sheets

(56) References Cited

U.S. PATENT DOCUMENTS

| | | |
|---|---|---|
| 8,083,416 B2 | 12/2011 | Scadden et al. |
| 8,113,722 B2 | 2/2012 | Scadden et al. |
| 8,147,147 B2 | 4/2012 | Khemakhem et al. |
| 10,215,934 B2 | 2/2019 | Pimpinella et al. |
| 2001/0012434 A1* | 8/2001 | Satoh .................... G02B 6/266 |
| | | 385/140 |
| 2002/0126967 A1 | 9/2002 | Panak et al. |
| 2006/0263011 A1* | 11/2006 | Chen .................... G02B 6/3888 |
| | | 385/75 |

FOREIGN PATENT DOCUMENTS

| | | | |
|---|---|---|---|
| WO | 2010090211 A1 | 8/2010 | |
| WO | WO-2010090211 A1 * | 8/2010 | ........... C09K 11/665 |
| WO | 2011097473 A2 | 8/2011 | |

\* cited by examiner

108 Ferrule   109 Metal flange

111 Plastic outer part

110 Metal interior part

HYBRID FIBER OPTIC AND ELECTRICAL CONNECTOR

PRIORITY

This application claims the benefit of U.S. Provisional Patent Application No. 63/342,488 filed May 16, 2022.

FIELD OF INVENTION

This disclosure describes a hybrid optical and electrical connector assembly utilizing the metal parts of existing fiber optic connectors. It provides the benefits of low cost, simple field termination, reliable optical communications with metallic conductors for remote electrical powering.

BACKGROUND AND PRIOR ART EVALUATION

Historically, security camera applications utilize proprietary protocols transmitted at low data rates over copper cable. The primary benefits of copper cabling are low cost, ease of termination, and the ability to provide electrical power to remote network devices over the same cable. However, higher bandwidth data transmission is needed when cameras are of higher definition. Therefore, optical fibers are often required. Single-mode and multimode glass optical fibers are high bandwidth and reliable transmission media in wide use from short reach data center server communications to oceanic transcontinental telecommunications. Hybrid fiber and copper cable that can provide high bandwidth data transmission and electric power are needed to power up the security camera.

Such hybrid cable needs to be terminated before connecting to a device or another hybrid cable. Since terminating fiber and copper cables are very different, people have developed new connectors to connect the hybrids cables. U.S. Pat. No. 7,213,975 describes s hybrid communications cable connector system comprising several fiber and copper connectors. However, such hybrid connectors are bulky and complicated to manufacture. Therefore, it is desirable to develop a compact hybrid connector.

USB cable connects computer hardware to computers. HDMI cable transmits audio and video data from HD sources, such as computers or Blu-ray and DVD players, to HDTVs or monitors. However, the maximum length of USB and HDMI copper cables are usually limited to a few meters when USB goes to a higher data rate, or HDMI goes to 4k and 8k speeds. The best way to extend the length is using a USB fiber optic extender or HDMI over fiber extender. These extenders can extend the USB cable to more than 100 meters over multimode fibers and even longer use single-mode fibers.

As shown in FIG. 1, the computer can power the local unit of such an extender. Since the duplex LC cable cannot provide power to the remote unit, it needs an AC power adaptor to power up the remote unit and the remote USB device. If we replace the fiber cable with a hybrid fiber and copper cable, we can provide power to the remote USB device where a power outlet is not available. The specification of USB 3.x needs to provide a maximum power of 4.5 W at a voltage of 5V and a current of 900 mA. This can be achieved by using a 22 AWG or thicker wire in the hybrid cable. The extenders will need to connect to the connectors of the LC fiber cable and connect to the copper cable of the hybrid cable. However, if we put conductors inside the LC fiber optic connector and fiber optic adaptor and connect them to the copper cables of the hybrid cable, we may be able to combine both optical and electrical connections in one connector by plugging them in once. This will save material, reduce connector size and installation time. Moreover, such hybrid fiber can copper connector could be field terminated like the OptiCam connector described in U.S. Pat. Nos. 7,011,454 and 10,984,519 to bring convenience and flexibility to installation.

SUMMARY

A first embodiment for the transmission of optical and electrical signals has first and second optical connectors wherein each of the connectors have a metal ferrule electrically connected to a conductor. The system also has an adapter wherein having the first and second connectors optically connected to each other via the adapter also electrically connects the conductor of the first optical connector to the second optical connector via the metal ferrules of the first and second optical connectors.

A second embodiment has first and second optical connectors wherein each of the connectors have an outer housing with a conductive interior surface. The system also has an adapter with at least one metal split sleeve wherein having the first and second connectors optically connected to each other via the adapter also electrically connects the conductor of the first optical connector to the second optical connector via the conductive interior surface of the outer housing of each optical connector contacting the at least one metal split sleeve.

DESCRIPTION OF INVENTION

This invention discloses a method to turn existing fiber optical connectors into hybrid optical and electrical connectors by adding copper or conductive parts inside the connector or fiber optic adaptor. The invention can be applied to several types of single or duplex optical connectors such as LC, SC, FC, ST, CS, and SN, or parallel optical connectors such as MTP/MPO.

Figure 1:
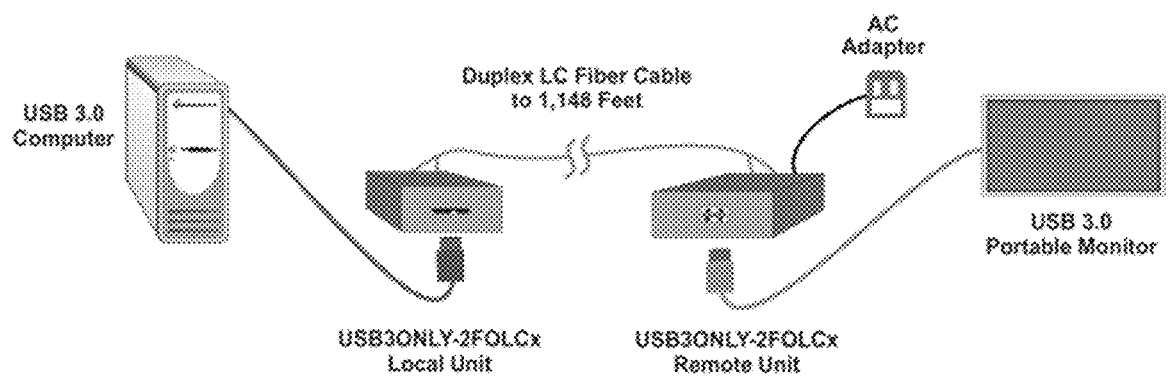
FIG. 1 shows how a computer can power the local unit of such an extender.
Figure 2:
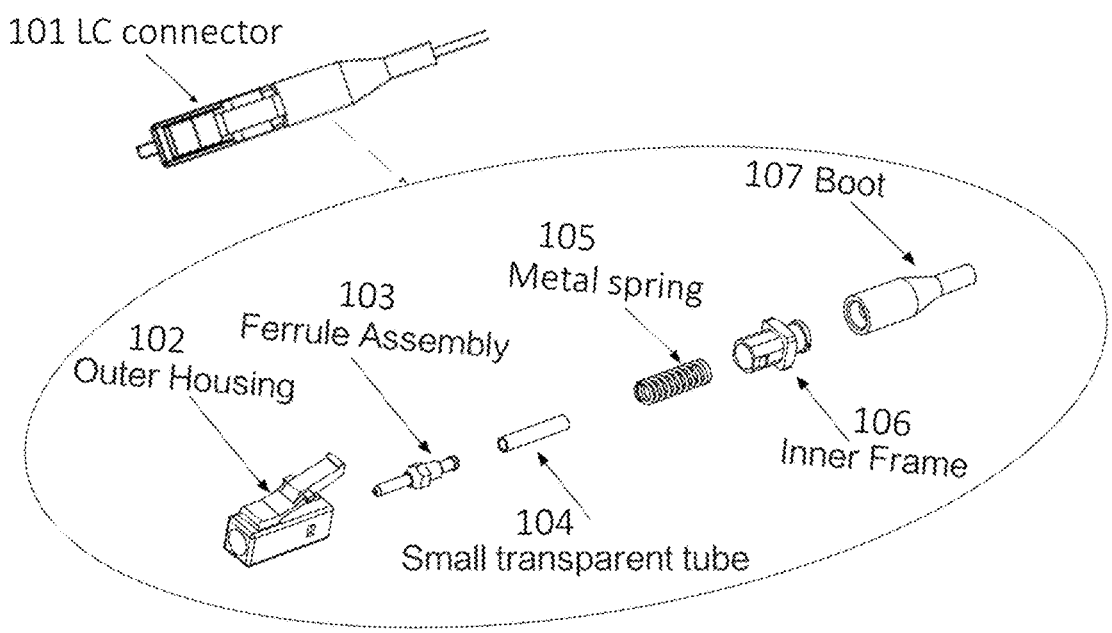
FIG. 2 shows an exploded isometric view of an LC connector according to the present invention.
Figure 3:
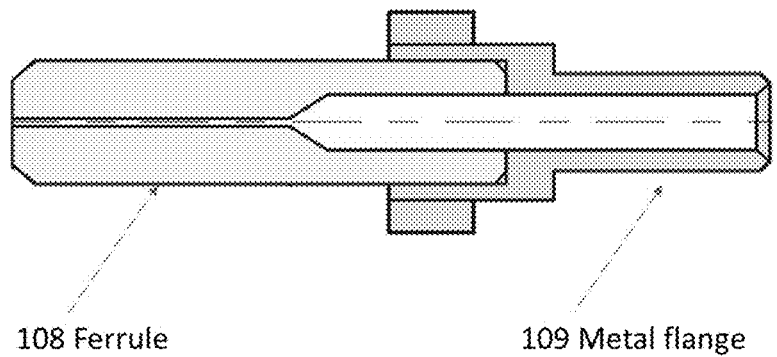
FIG. 3 shows a cross-sectional view of the ferrule assembly used in the LC connector of FIG. 2

All the single fiber connectors, such as LC, SC, FC, ST, CS, and SN, have a ferrule 108, as shown in FIGS. 2 and 3. If we choose the material of the ferrule and some other interior parts of the connector a conductive material, we can turn a fiber optic connector into a hybrid fiber and copper connector without changing the form factor of the connector. We'll use an LC connector as an example to describe how we could achieve this.

FIG. 2 shows an LC connector 101 consisting of outer housing 102, ferrule assembly 103, small transparent tube 104, metal spring 105, inner frame 106, and boot 107. The ferrule assembly includes a ferrule 108 and a metal flange 109, as shown in FIG. 3.

FIG. 3 shows a ferrule assembly which consists of a ferrule 108 and a metal flange 109.

Figure 4:
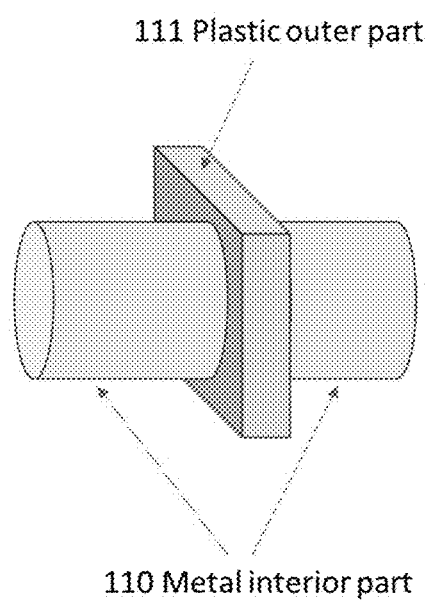
FIG. 4 shows an isometric view of the LC inner frame used in the LC connector of FIG. 2.

FIG. 4 shows a modified LC inner frame consisting of a metal interior part 110 and a plastic outer part 111.

Figure 5:
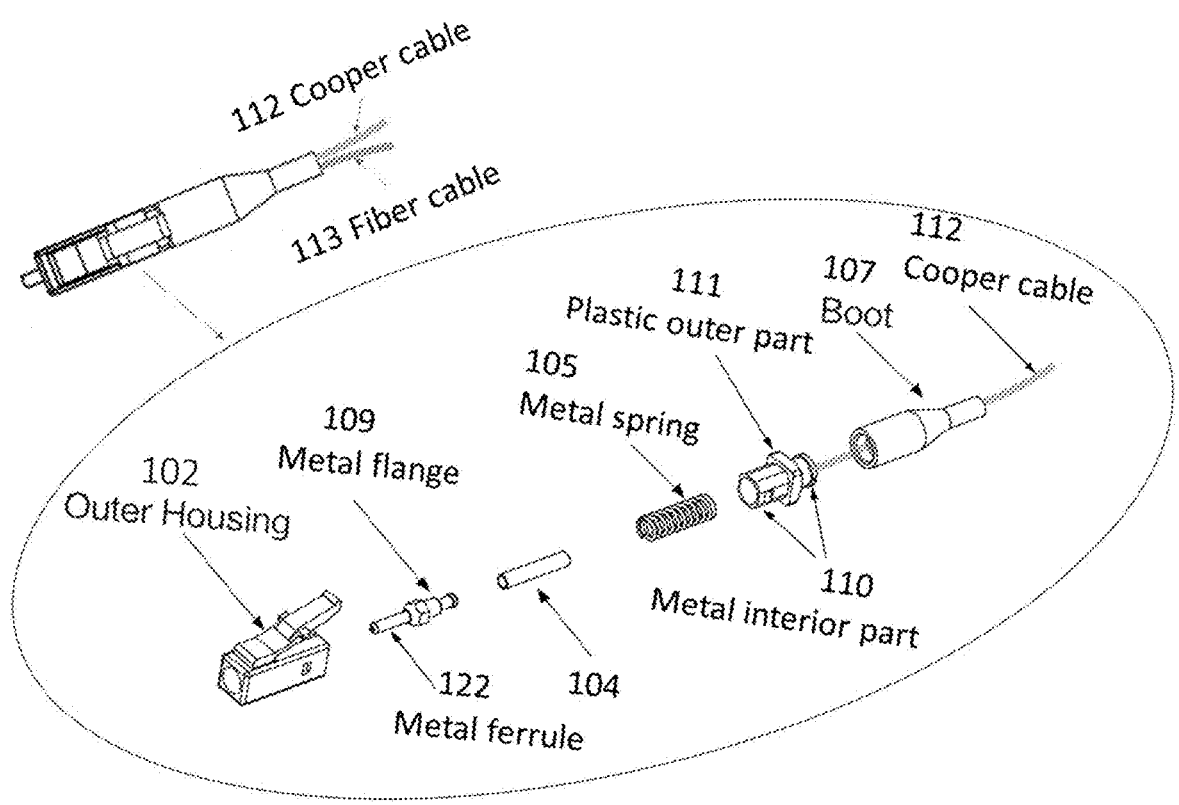
FIG. 5 shows an exploded isometric view of the LC connector of FIG. 2 with the showing how the conductive parts are electrically connected.

In most cases, the ferrule material is ceramic, and the metal ferrule is used in some cases. If we choose the material of ferrule as metal, change the interior part 110 of the inner frame to the metal as shown in FIG. 4, and solder or weld the right side of the inner frame to a copper cable 112 as shown in FIG. 5, then we will have good electrical conductivity between the metal ferrule and copper cable because several metal parts between them connect them. In addition, some of the joints, such as spring to metal flange and spring to the inner frame, could be soldered or welded together to improve the electrical conductivity.

FIG. 5 shows a compact hybrid fiber and copper connector with metal ferrule and other metal parts to connect the metal ferrule and copper cable electrically.

As shown in FIG. 5, we get a compact hybrid fiber and copper connector without changing the form factor of an LC fiber optic connector. It has a fiber pigtail and a copper pigtail connected to both fiber and copper cables. If the copper cable is protected with a plastic or rubber jacket, most of the metal parts are covered by plastic or rubber. Therefore, the metal ferrule tip is the only metal part exposed to the user's hands.

Figure 6:
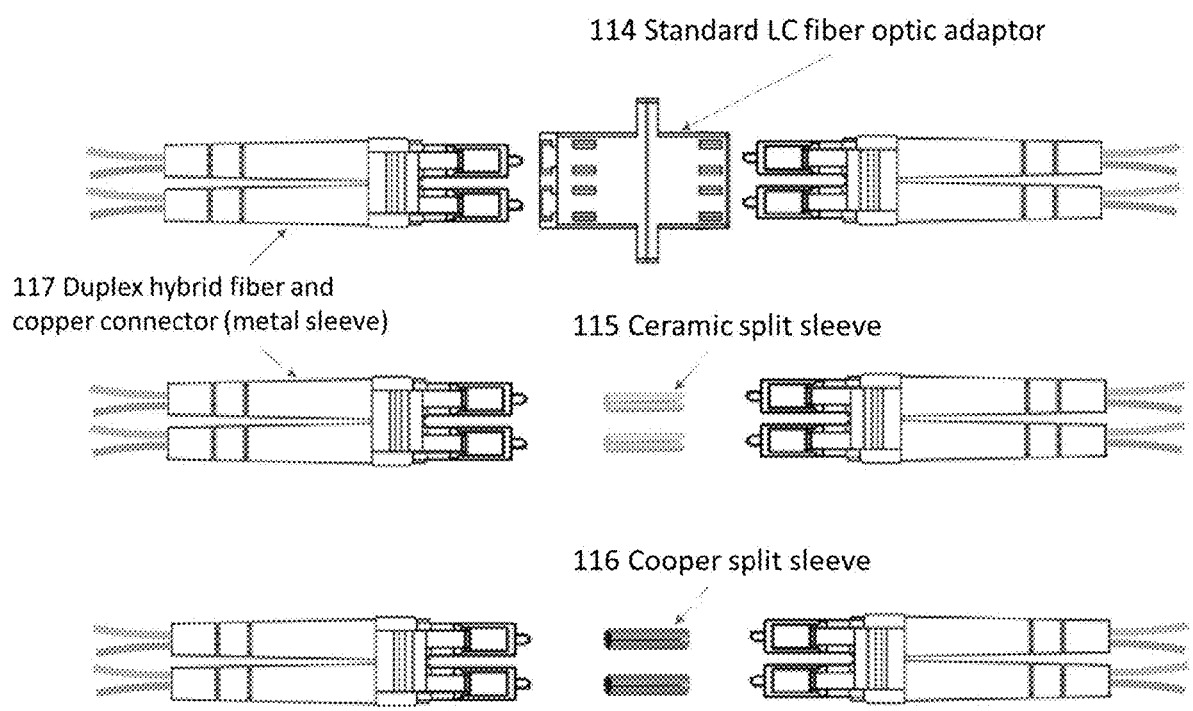
FIG. 6 shows how the electrical connections can be made in a duplex LC arrangement using both copper split sleeves and ceramic split sleeves.

FIG. 6 (top) shows duplex compact hybrid fiber and copper connectors are connected by standard LC fiber optic adaptors 114.

FIG. 6 (middle) shows that the fiber optic adaptors have a ceramic split sleeve 115. In this way, the tips of the metal ferrules of the two connectors will contact each other to make sure the two connectors are connected electrically.

FIG. 6 (bottom) shows that the fiber optic adaptors have a copper split sleeve 116. In this way, the two connectors are electrically connected by both the tips of the ferrules and the metal split sleeve. Hence it has better electrical conductivity than FIG. 5 (middle).

Usually, the metal ferrule is used for multimode connectors only. A single mode fiber connector typically only uses ceramic ferrule because it has better precision than a metal ferrule. To electrically connect two fiber optic connectors using ceramic ferrule, we can use metal material in other parts of the fiber optic connector and the fiber optic adaptor.

Figure 7:
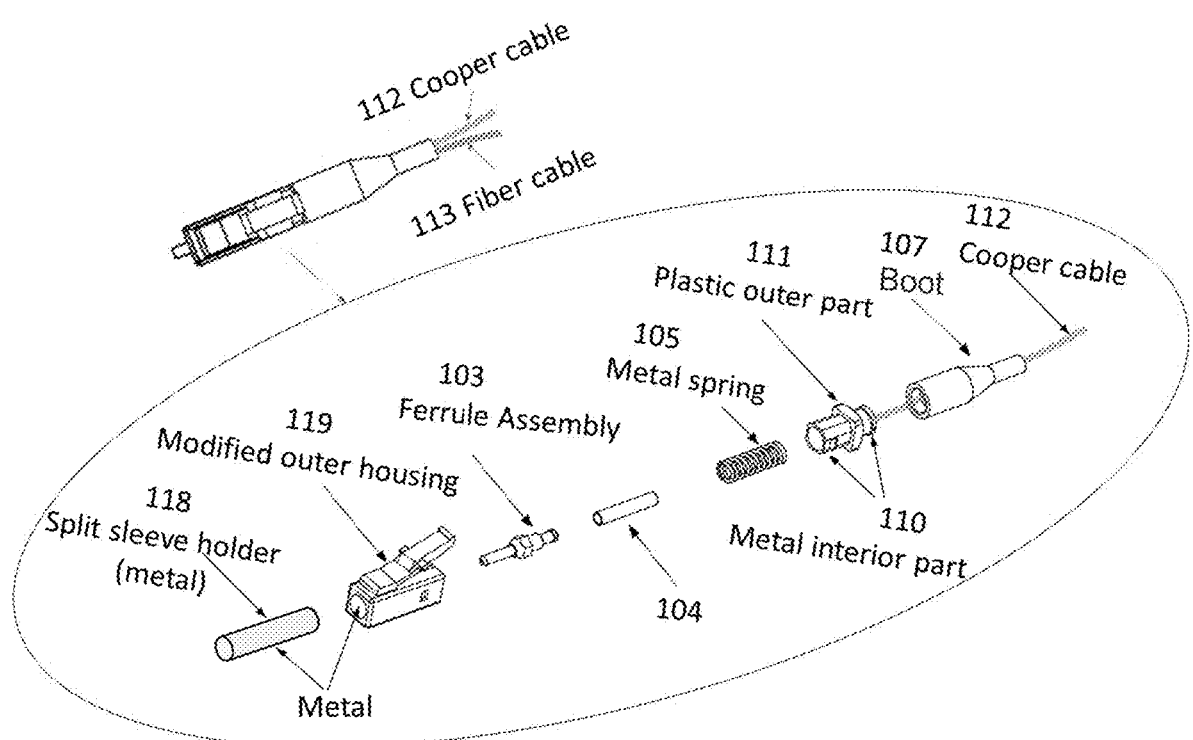
FIG. 7 shows an exploded isometric view of a second embodiment of an LC connector according to the present invention.

FIG. 7 shows a hybrid fiber and copper connector using a modified LC inner frame which consists of a metal interior part 110 and plastic outer part 111, a modified outer housing 119 whose internal surface is metal, either by coating metal to the interior surface or have a metal ring, strip, or wire inside, and a modified split sleeve holder whose outer surface is metal or partially metal. Same as shown in FIG. 5, the right part of the inner frame in FIG. 7 will be soldered, welded to, or have a tight physical contact to a copper cable 112. Two of such hybrid fiber and copper connectors will be electrically connected by a metal part inside the fiber optic adaptor, such as a split sleeve holder whose material is metal or partially metal.

Moreover, as all the metal parts (including the metal split sleeve holder which is inside the plastic housing of the fiber optic connector) are either inside the plastic housing of the connector or fiber optic adaptor, and the copper cable is protected by the plastic or rubber jacket, none of the metal parts is exposed to user's hands. Therefore, better safety is achieved than the hybrid fiber and copper connector in FIG. 5, whose metal ferrule could be exposed to the user.

Figure 8:
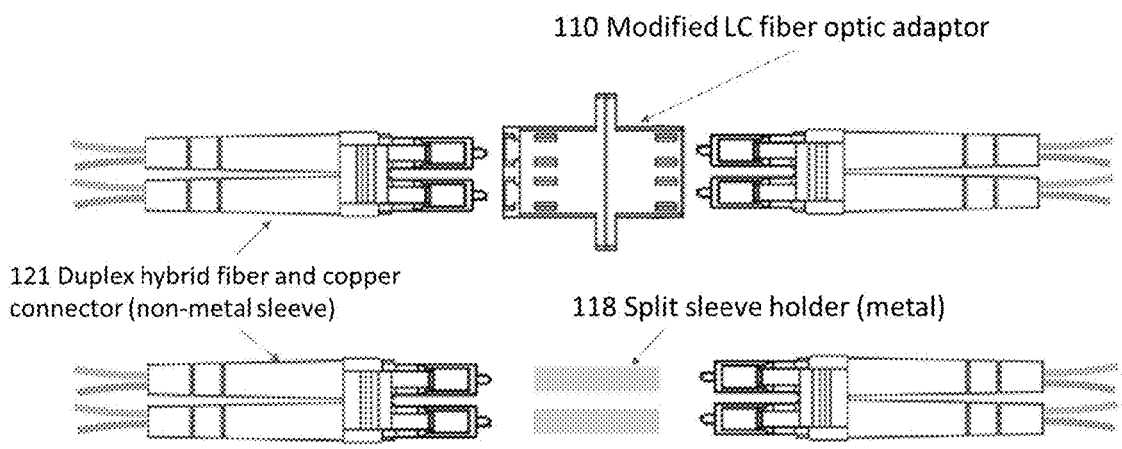
FIG. 8 shows how electrical connections can be made using the LC connectors of FIG. 7.

FIG. 8 shows duplex compact hybrid fiber and copper connectors from FIG. 7 are connected by modified LC fiber optic adaptor with metal split sleeve holder.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for the transmission of optical and electrical signals comprising:
   first and second LC optical connectors arranged as LC duplex connectors wherein each of the connectors have a metal ferrule electrically connected to a conductor via a metal spring and at least one metal interior part; and
   an adapter wherein having the first and second connectors optically connected to each other via the adapter also electrically connects the conductor of the first optical connector to the second optical connector via the metal ferrules of the first and second optical connectors.

2. The system of claim 1 wherein the adapter has at least one ceramic split sleeve.

3. The system of claim 1 wherein the adapter has at least one metal split sleeve.

4. A system for the transmission of optical and electrical signals comprising:
   first and second LC optical connectors arranged as LC duplex connectors wherein each of the connectors have an outer housing with a conductive interior surface, the conductive interior surface being electrically connected to a conductor via a metal spring and at least one interior metal interior part; and
   an adapter with at least one metal split sleeve wherein having the first and second connectors optically connected to each other via the adapter also electrically connects the conductor of the first optical connector to the second optical connector via the conductive interior surface of the outer housing of each optical connector contacting the at least one metal split sleeve.

* * * * *